United States Patent
Benedict et al.

(10) Patent No.: US 9,533,533 B2
(45) Date of Patent: Jan. 3, 2017

(54) VEIN-STYLE AIR PUMPING TUBE AND TIRE SYSTEM AND METHOD OF ASSEMBLY

(71) Applicant: The Goodyear Tire & Rubber Company, Akron, OH (US)

(72) Inventors: Robert Leon Benedict, Tallmadge, OH (US); Thulasiram Gobinath, Hudson, OH (US); Cheng-Hsiung Lin, Hudson, OH (US); Robin Lamgaday, Wadsworth, OH (US); Robert Allen Losey, Kent, OH (US); Jean-Claude Patrice Philippe Griffoin, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 306 days.

(21) Appl. No.: 14/260,590

(22) Filed: Apr. 24, 2014

(65) Prior Publication Data

US 2015/0306924 A1 Oct. 29, 2015

(51) Int. Cl.
*B60C 23/12* (2006.01)
*B60C 23/00* (2006.01)

(52) U.S. Cl.
CPC .......... *B60C 23/004* (2013.01); *B60C 23/12* (2013.01)

(58) Field of Classification Search
CPC .............................. B60C 23/12; B60C 23/10
USPC ................................................ 152/419–426
See application file for complete search history.

(56) References Cited

U.S. PATENT DOCUMENTS

| 1,050,886 | A | 1/1913 | Wetherell | |
|---|---|---|---|---|
| 1,134,361 | A | 4/1915 | Wetherell | |
| 1,682,922 | A | 9/1928 | McKone | |
| 3,304,981 | A | 2/1967 | Sheppard | |
| 3,833,041 | A | 9/1974 | Glad et al. | 152/347 |
| 4,922,984 | A | 5/1990 | Dosjoub et al. | 152/415 |
| 5,052,456 | A | 10/1991 | Dosjoub | 152/415 |
| 7,117,731 | B2 | 10/2006 | Hrabal | 73/146 |
| 7,225,845 | B2 | 6/2007 | Ellmann | 152/426 |
| 8,042,586 | B2 | 10/2011 | Losey et al. | 152/426 |
| 8,113,254 | B2 | 2/2012 | Benedict | 152/415 |
| 8,327,897 | B2 | 12/2012 | Firestone | 152/509 |
| 8,695,661 | B2 * | 4/2014 | Delgado | B60C 23/12 |
| | | | | 152/415 |

(Continued)

FOREIGN PATENT DOCUMENTS

| CN | 101844491 A | 9/2010 |
|---|---|---|
| CN | 102233797 A | 11/2011 |

(Continued)

OTHER PUBLICATIONS

EPO search report received by Applicant on Aug. 20, 2015.
Chinese Search Report received by Applicant on Aug. 1, 2016.

*Primary Examiner* — Jason Bellinger
(74) *Attorney, Agent, or Firm* — Edward T. Kennedy

(57) ABSTRACT

An air pumping tube and tire system and method of assembling is provided in which a tire groove is formed to extend into a flexing region of a tire sidewall and a complementary air pumping tube inserts into the tire groove. In the green, uncured air pumping tube condition, one or more check valves are assembled into the air pumping tube through access shafts and align with an internal air passageway of the air pumping tube. Plug components of the system enclose the check valves in the air pumping tube and the check valve-containing green air pumping tube is then cured.

20 Claims, 10 Drawing Sheets

(56) References Cited

U.S. PATENT DOCUMENTS

| | | | |
|---|---|---|---|
| 8,960,249 B2* | 2/2015 | Lin | ............... B60C 23/12 |
| | | | 152/419 |
| 9,199,518 B2* | 12/2015 | Benedict | ............ B60C 23/12 |
| | | | 152/426 |
| 2009/0294006 A1 | 12/2009 | Hrabal | ................ 152/426 |
| 2012/0073716 A1 | 3/2012 | Benedict | |
| 2013/0299055 A1 | 11/2013 | Gobinath et al. | |
| 2014/0110029 A1* | 4/2014 | Benedict | ............ B60C 23/12 |
| | | | 152/426 |

FOREIGN PATENT DOCUMENTS

| | | |
|---|---|---|
| DE | 3433318 | 3/1986 |
| EP | 0237496 B1 | 7/1991 |
| EP | 2384912 A1 | 11/2011 |
| EP | 2664467 A1 | 11/2013 |
| RU | 2106978 | 3/1998 |
| SE | 183890 | 5/1963 |
| WO | 03/049958 | 6/2003 |
| WO | 2005/012009 | 2/2005 |
| WO | 2007/134556 | 11/2007 |
| WO | 2010/008338 | 1/2010 |

* cited by examiner

VEIN-STYLE AIR PUMPING TUBE AND TIRE SYSTEM AND METHOD OF ASSEMBLY

UNITED STATES GOVERNMENT FUNDING

This invention was made with government support under contract number DE-EE0005447 awarded by the Department of Energy. The government has certain rights in the invention.

FIELD OF THE INVENTION

The invention relates generally to air maintenance systems for a tire and, more specifically, to such systems that assemble an air pump apparatus into a tire in order to pump air into the tire as the tire rotates.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain a desired level of air pressure within the tire and compensate for any reduction in tire pressure over time without the need for driver intervention.

SUMMARY OF THE INVENTION

In one aspect of the invention, an air pumping tube and tire system and method of assembling is provided in which a tire groove is formed to extend into a flexing region of a tire sidewall and a complementary air pumping tube inserts into the tire groove. In the green, uncured condition, one or more access shaft(s) are formed in the air pumping tube to provide admittance of one or more check valve device(s) to a check valve seating depth, wherein in the check valve device(s) align with the air passageway. A plug component of the system substantially fills each access shaft after insertion of the check valve devices. Each access shaft is formed by the removal of a slug component from the air maintenance tube which is replaced by a shaft-residing plug component.

In another aspect, the air pumping tube is configured having a mushroom sectional configuration comprising a larger diameter tube cap and an adjoining smaller diameter tube base. The air passageway resides along a mid-region of the air pumping tube at the intersection of the cap and base of the air pumping tube.

Pursuant to a further aspect, the air passageway is elliptical in sectional configuration and oriented to extend in a longitudinal axial direction between the tube cap and the tube base.

According to another aspect, the slug component(s) are removed, the check valves inserted, and the plug component(s) placed with the air pumping tube in an uncured condition. Subsequent to placement and enclosure of the check valves within the air pumping tube by system plug components, the air pumping tube is cured. The plug components, the outer body of each check valve device, and the air pumping tube are composed of compatible materials that bond together as result of the curing procedure. Post cure, the air pumping tube containing the check valves are inserted into the sidewall groove of the cured tire.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
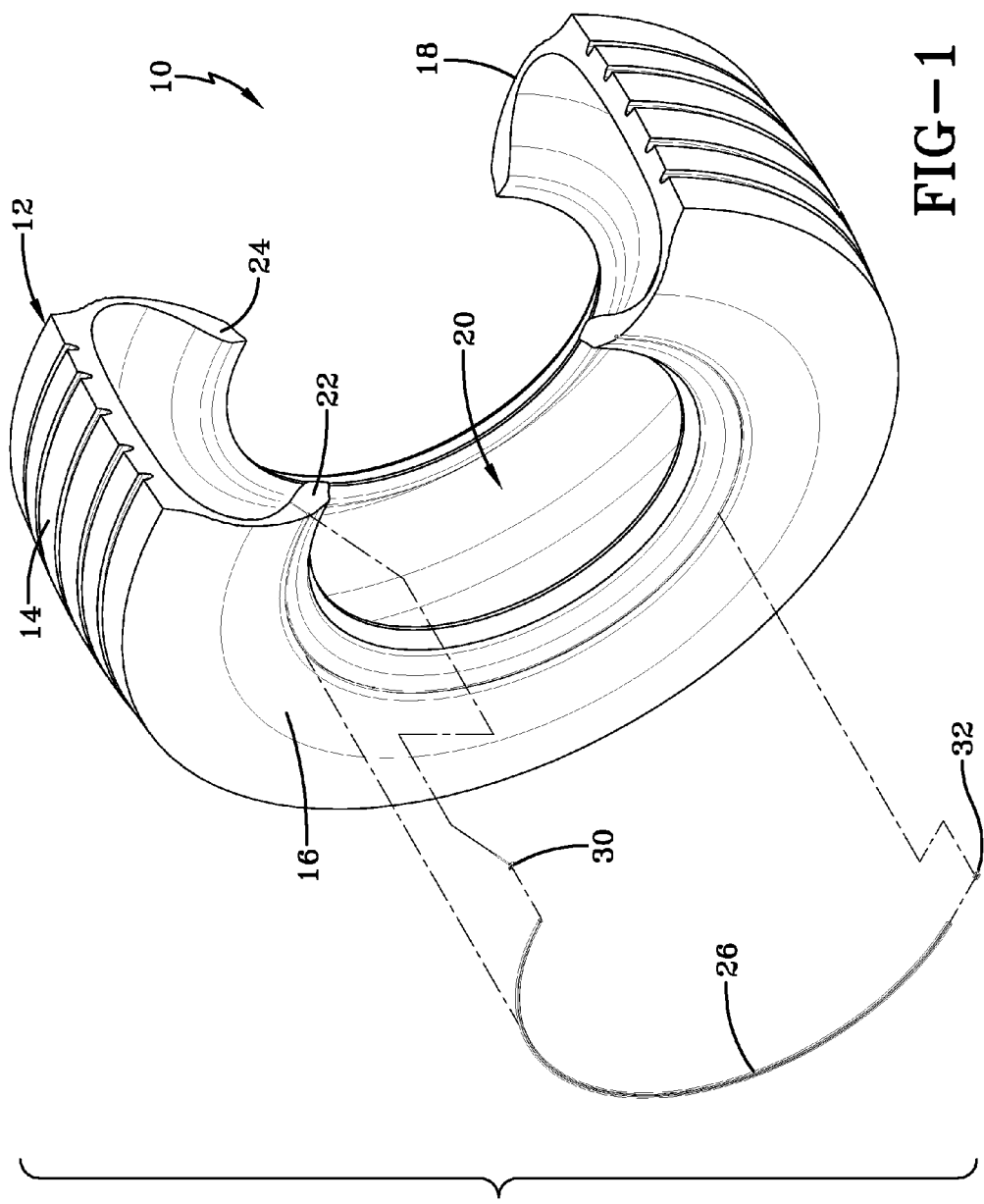
FIG. 1 is a perspective view of tire with vein tube.
Figure 5:
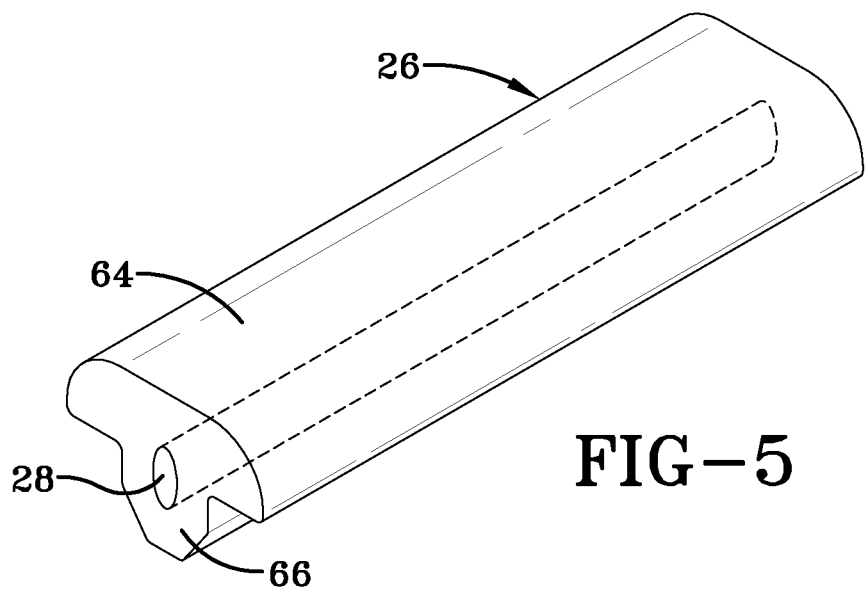
FIG. 5 is a perspective view of extruded tubing with teardrop passage.

Referring to FIGS. 1 and 5, a tire and air maintenance pump assembly 10 (forming an air maintenance tire or "AMT") includes a tire 12 and a vein pump assembly including a vein tube 26. The general operation of a peristaltic pump for use in a tire is described in U.S. Pat. Nos. 8,113,254 and 8,042,586 which were both filed on Dec. 12, 2009, and issued on Feb. 14, 2012 and Oct. 25, 2011, respectively, and are incorporated herein in their entirety by reference. The tire is constructed to provide a tread region 14, a pair of sidewalls 16, 18 extending from opposite bead areas 22, 24 to the tire read region 14. The tire encloses a tire cavity 20. The air maintenance assembly includes an elongate air tube 26 that encloses an air passageway 28 that is generally elliptical in cross-section. The tube 26 is formed of a resilient, elastomeric flexible material such as plastic or rubber compounds and composites that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purpose of maintaining air pressure within the cavity 20. The tube 26 is shown to follow a 180° semi-circular path in the configuration of FIG. 1. However, other configurations, such as 360° annular tube, may be employed without departing from the invention.

The air maintenance vein pump assembly further includes an inlet device 30 and an outlet device 32 spaced apart approximately 180° at respective opposite end locations of the air tube 26. The outlet device 32 has a T-shaped configuration in which T-forming sleeves connect to an end of the tube 26 and an outlet conduit conducts air from the tube to the tire cavity 20. The inlet device 30 likewise is of a T-shaped configuration, connecting to an opposite end of the tube 28 and having an inlet conduit which intakes outside air into the tube passageway 28. The pending applications previously identified and incorporated herein provide the details of the outlet and inlet devices. Situated within the inlet and outlet devices are appropriate, commercially available valve mechanisms for controlling air intake into the tube 26 and outlet from the tube into the cavity 20.

Figure 9:
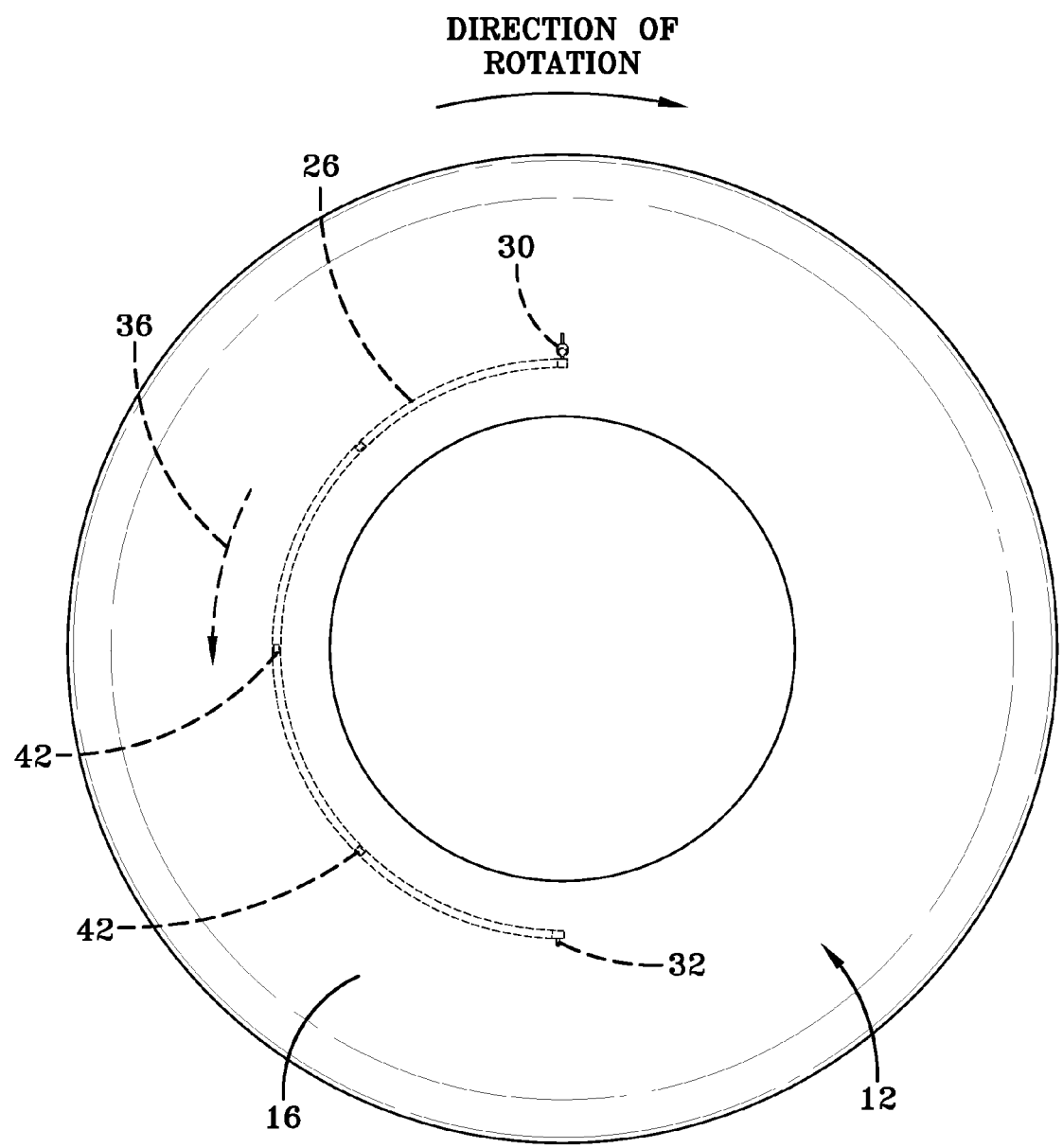
FIG. 9 is a plan view of tire with extruded tubing and check valves in a 180° embodiment.

As will be appreciated from FIGS. 1 and 12 through 15, the air tube 26, inlet device 30, and the outlet device 32 are positioned within an appropriately complementarily configured channel 34 within one or both of the tire sidewalls 16, 18. As seen in FIG. 9, as the tire rotates in the direction of rotation indicated, a footprint is formed against a ground surface (not shown). A compressive force is thus directed into the tire from the footprint and acts to flatten a segment of the air tube 26 and passageway 28. As the tire rotates further, the air tube and passageway are sequentially flattened and pump air in the direction 36 shown. Flattening of the tube segment by segment thereby forces air from the inlet along tube passageway 28, until the pressurized air is directed from the outlet and into the tire cavity. Appropriate valve mechanism at the outlet will vent the air in the event that the tire cavity pressure is at or above the recommended tire pressure. Pumping of air occurs for one-half the revolution of the tire with the 180 degree air tube configuration shown.

Assembly of the check valves into the air tube may be made so as to create a segmented vein air tube. The check valves serve to avoid back flow, control air flow direction, and provide a simplified pump mechanism from compression ratio and pinching force to compression ratio only. The construction of an air pumping tube can be done by segmenting the tube and connecting opposite ends of each air tube segment to a check valve. An alternative assembly may be effected by means of specialized clamping and expansion of tube, insertion of the check valves to desired respective locations within the tube, whereby forming a complete air tube and check valve assembly. The assembly may then be inserted into a groove within the tire sidewall in a post-cure assembly procedure. Co-pending U.S. patent application Ser. No. 13/659,080, filed Oct. 24, 2012, and entitled VEIN PUMP ASSEMBLY FOR AIR MAINTENANCE TIRE shows such an assembly sequence and method.

The subject invention achieves yet a further alternative method of forming a peristaltic air pumping tube having a series of check valves positioned at intervals along the tube. The subject method of check valve placement includes the steps: extruding or molding a unitary tubing with one or more open section(s) or shaft(s) on the tube; inserting check valves after extrusion into each open section(s) or shaft(s) (green tube); closing the open section(s) or shaft(s) after the valves are inside the green tubing; and curing the green tubing to ensure a proper seal between the check valves and the tubing.

The subject method avoids check valve connection to tubing post-cure; does not require a high deformation of tire sidewall to provide pumping; eliminates back flow; can accept tire/groove dimensional and/or geometrical variation or irregularity; can accept rim dimensional and/or geometrical variation or anomaly; achieves a higher efficiency in pumping than previous air tube construction methods; and eliminates dead-end air volume issues.

Figure 2:
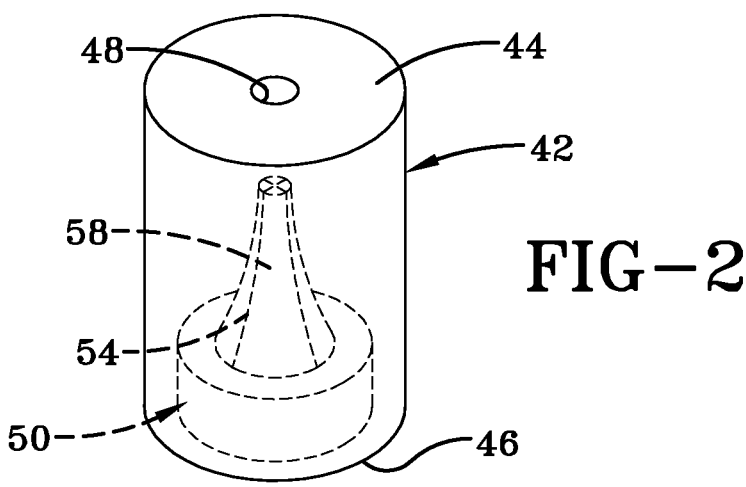
FIG. 2 is a perspective view of check valve.
Figure 3:
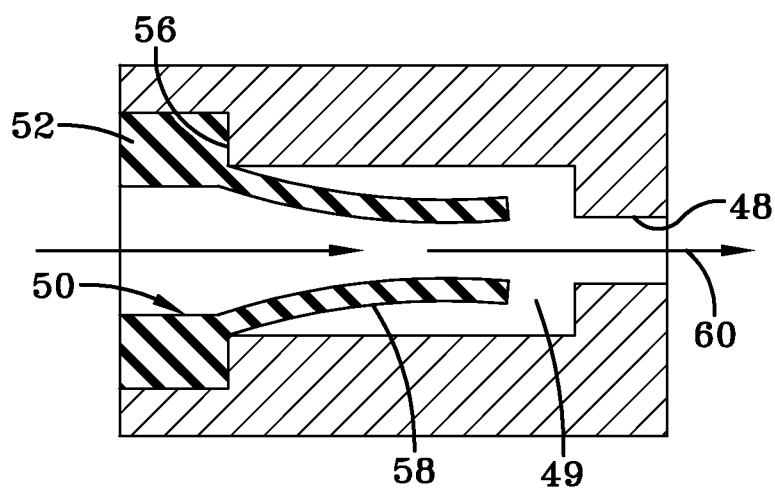
FIG. 3 is a section view of check valve open, allowing air flow.
Figure 4:
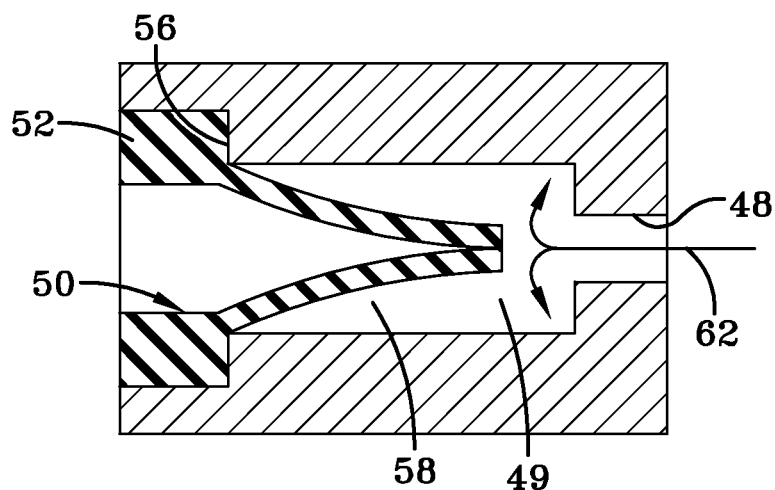
FIG. 4 is a section view of check valve closed, blocking air flow.

With reference to FIGS. 2, 3 and 4, a check valve insert body 42 of generally cylindrical geometry is formed out of suitable elastomeric or rubber composition. The body 42 includes end walls 44, 46, and a through bore 48 extending there through along a longitudinal axis. Situated within the body 42 is a valve chamber 49 dimensioned to receive a check valve 50. The check valve 50 includes a rearwardly disposed seating collar 52 seated within the valve chamber 49 against an internal shoulder 56. A slotted conical membrane 58 is secured to collar 52 and tapers inwardly forward into the chamber 49. The membrane 58 includes peripheral slits 54 spaced about a circumference that allow the membrane 58 to divergently open as shown in FIG. 3 when subjected to air pressure in direction 60; and, upon removal of the air pressure, resume a closed configuration as shown in FIG. 4 by directional arrow 62. As used herein, "check valve component" refers to the assembly constituting the check valve body 42 containing the check valve 50 therein.

Figure 10:
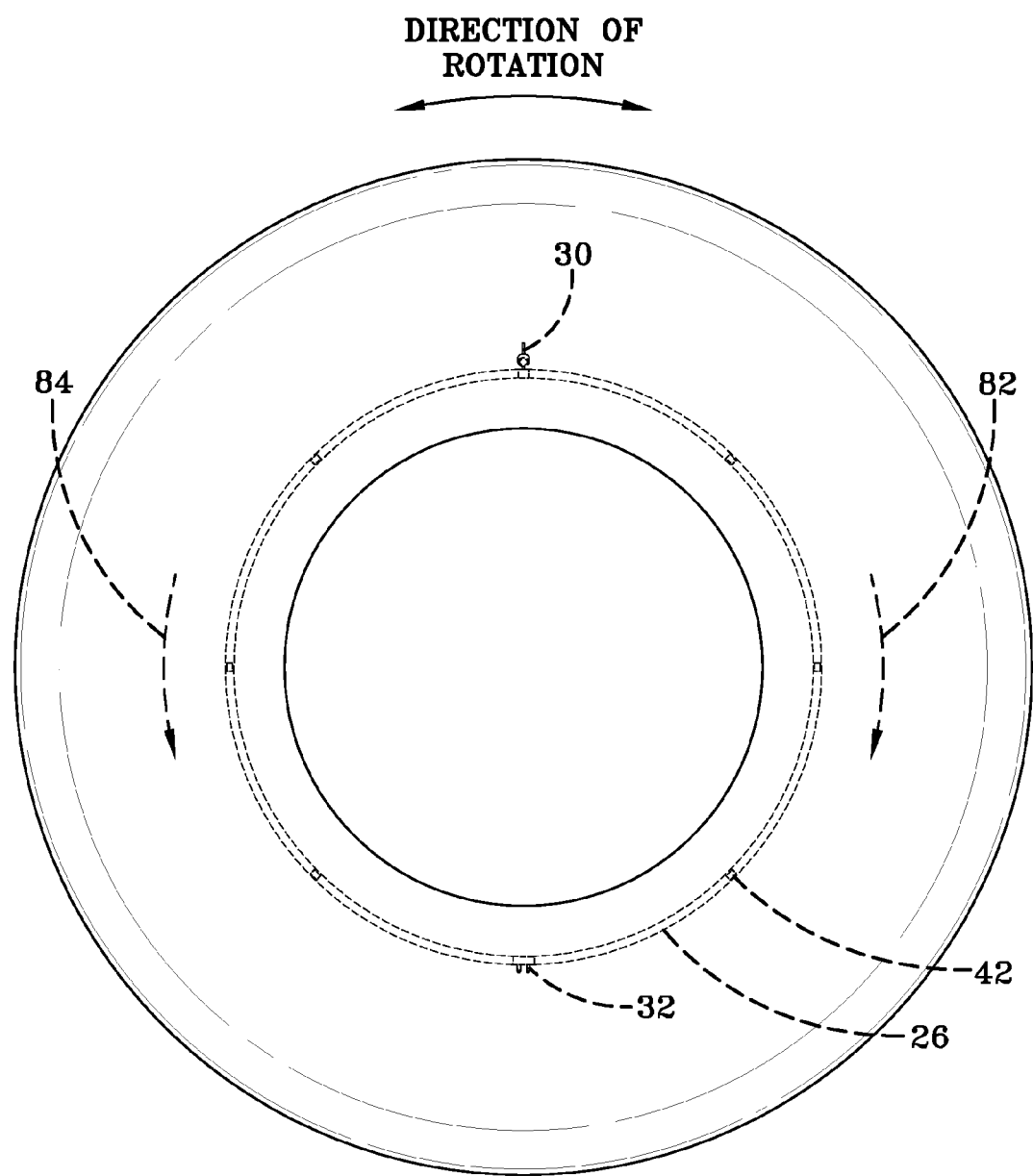
FIG. 10 is a section Plan view of tire with extruded tubing and check valves in a double 180° embodiment.

FIGS. 5, 6, 7 and 8 show an assembly sequence whereby multiple check valves 50 are assembled into the axial passageway 28 of the elastomeric flexible tube 26. The multiple check valves 50, each housed within a body 42, occupy spaced apart respective locations within the tube 26 in an orientation which facilitates a flow of pressurized air in a forward direction from the inlet device 30 to the outlet device 32 (FIG. 9) but which prevents a back flow of pressurized air in the reverse direction. As seen in FIG. 5, the peristaltic air tube 26 is formed having a generally mushroom shaped sectional profile formed by a wide tube cap or lobe 64 and a smaller width underlying tube base 66. The air passageway 28 is generally elliptical in section, having a longitudinal axis oriented along a transverse axis of the elongate air tube 28. The air passageway extends longitudinally co-extensive with the air tube 26 at a mid-air tube depth location generally where the cap 64 of the tube 26 intersects the base 66 of the tube. The tube 26 is formed of elastomeric material, preferably of rubber or composite rubber materials, by conventional means such as extrusion or molding. The tube 26 during check valve assembly is in its green (also referred herein as "pre-cured" or "uncured") form. Subsequently, the air tube 26 containing the check valves is cured and inserted into a complementary groove formed within a cured tire. The tube 26 has a length sufficient to extend an intended path about a lower region of a tire sidewall 16. In the path designated by FIG. 9, the tube 26 follows a curvilinear path of 180°. Alternatively, as seen in FIG. 10, the tube 26 and corresponding groove 34 may be formed in a 360° path so as to pump air continuously during each entire tire revolution.

Figure 6:
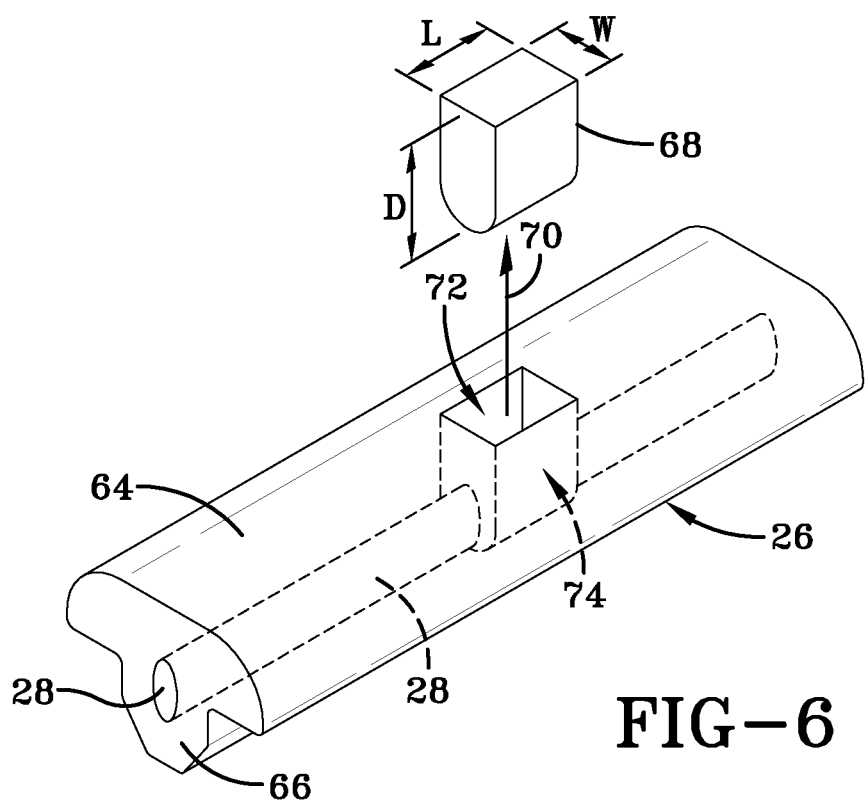
FIG. 6 is a perspective view of extruded tubing having a section removed for check valve.

Referring to FIG. 6, an access slug component 68 of the green tube 26 is removed after the tube is formed by means of an extrusion or molding. Removal of multiple slug components may be performed if desired, either in sequence or in unison. The slug component 68 is removed in the direction 70 and creates a portal 72 and access shaft 74 that extend into the cap 64 to a depth encompassing the depth of the air passageway 28 within the tube 26. Location of the access shaft 74 along the tube 26 is at a preselected location where placement of a check valve is desired. One or, preferably, multiple slug components 68 (one being shown in FIG. 6) are removed from the tube 26, forming a series of access shafts 74 at spaced apart intervals where the location of multiple check valves is desired. Each slug component 68 removed leaves a shaft 74 that has a depth D sufficient to extend through the tube cap 64 and into the narrow tube base 66. Each slug component 68 has a width W and depth D closely complementing a check valve body to be inserted into the shaft vacated by the slug. The slug component 68 further has a depth sufficient to extend into the air tube 26 to a sufficient depth to reach the air passageway 28. The width and length of each slug component 68 corresponds to the width and length of the shaft 74 needed for insertion of a check valve device.

Figure 7:
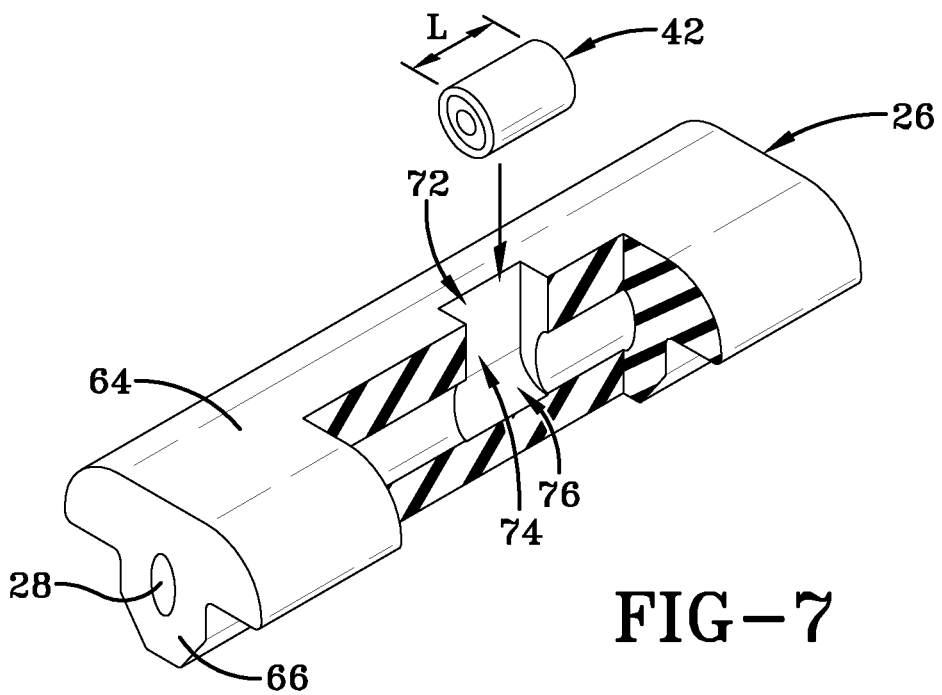
FIG. 7 is a perspective view of extruded tubing receiving the check valve.
Figure 8:
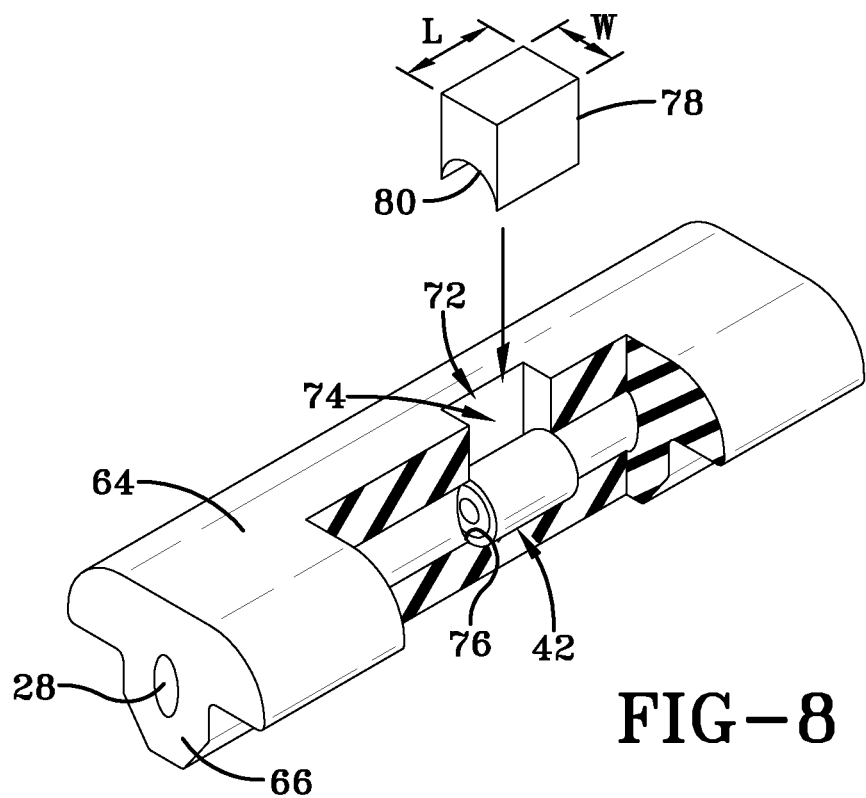
FIG. 8 is a perspective view of extruded tubing with check valve in place, receiving a plug component.

FIG. 7 shows insertion of the check valve body 42 into the access shaft 74 and downward into a supportive check valve seat 76 at a lower terminal end of the shaft 74. Accurate control of the depth D of the slug component 68 places the check valve seat 76 and the check valve body 42 therein in an aligned location with the air passageway 28 of the tube 26. The length of the check valve body 42 correlates with the length L of the slug component 68 such that the body 42, once inserted down the shaft 74 and into the seat 76, is co-extensive with the segment of passageway 28 removed by the removal of the slug component 68. FIG. 8 shows the check valve body 42 seated within the seat 76. It will be appreciated that the width and length W and L of the body 42 fills the void within the lower region of the shaft 74 vacated by the slug component 68. It will further be noted that, when seated, the check valve body 42 is located at a depth within the air tube 26 correlating with the depth of the air passageway 28. The shaft 74 thus extends to a depth at the intersection of the enlarged cap 64 of the air tube 26 and the narrower base 66 of the air tube body 26.

After inline placement the check valve body 42 into the air tube 26, a quadrilateral plug component 78 is inserted through the portal 72 and into the shaft 74 of the tube 26, substantially filling the void within shaft 74 vacated by slug component 68. The plug component 78 has a width W and length L facilitating a close fit insertion of the plug component into the shaft 74. The plug component 78 is formed as a generally rectangular quadrilateral body and includes a semi-cylindrical undercut 80 within a bottom plug component surface. The undercut 80 circumscribes the check valve body 42 seated within the seat 76, filling the void surrounding the body 42. The plug component 78 is formed from green, uncured material composition matching the material composition of the air tube 26 or from a compatible material or composite capable of bonding with the material of air tube 26. Once the plug component 78 is fully inserted into the shaft 74, the air tube 26 is restored to its original external geometry.

The aforementioned sequence for insertion of a check valve body 42 into the air tube 26 is repeated either sequentially or in unison for all check valve bodies which are intended for the air tube at their respective locations along the air tube 26. Once insertion of the check valve bodies 42 and closing insert plug components 78 is complete, the green air tube and check valve assembly is complete and ready for curing. When subject to heat in a curing cycle, the elastomeric air tube 26 bonds with the insert plug components 78 to seal in the check valves 42 and re-establish a uniform external geometry along the air tube 26. The check valve bodies 42, composed of material compatible with that of the air tube 26, likewise bonds with the air tube material to fix the bodies 42 at their preferred locations along the air tube.

Figure 12:
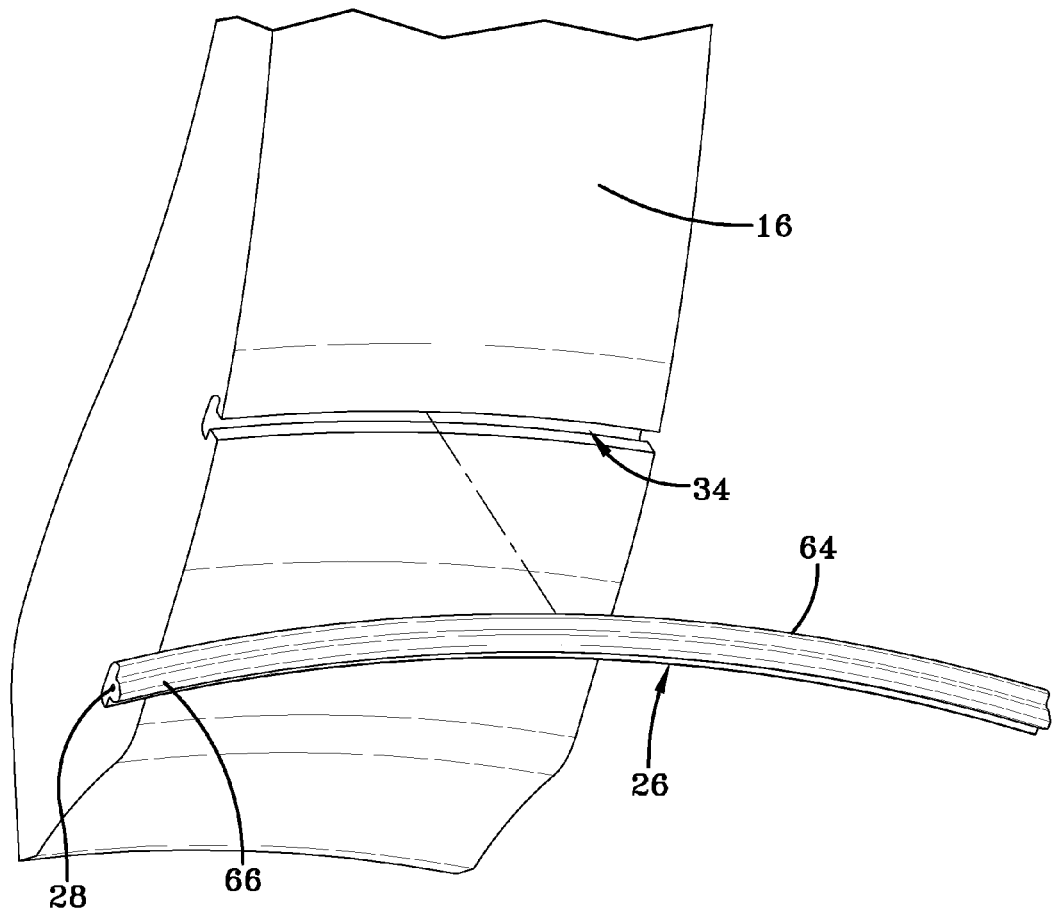
FIG. 12 is an enlarged perspective section view of tire with slot for receiving extruded tubing.
Figure 13:
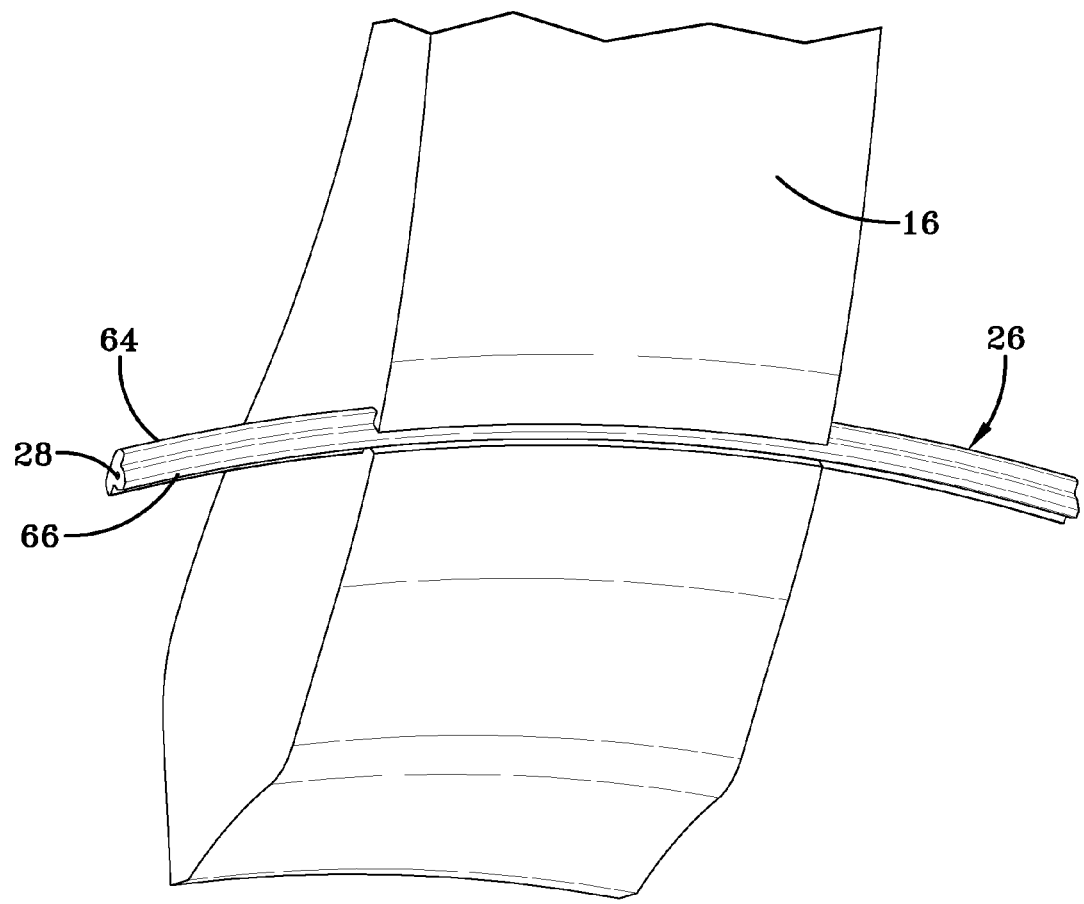
FIG. 13 is an enlarged perspective section view of tire with extruded tubing in place.

To assemble the post-cured air tube and check valve assembly into a post-cured tire, as seen in FIG. 12, the air tube 12 is oriented opposite the groove 34 within the lower region of sidewall 16. The groove 34 is formed having a sectional geometry complementary to the external geometry of the air tube 26. The opening to the groove 34 is enlarged by appropriate tooling (not shown). The air tube 26 then inserts into the groove 34 in an orientation in which the enlarged cap 64 is radially inwardmost within the groove and the narrower tube base 66 faces radially outward. FIG. 13 shows the fully inserted tube 26 within the sidewall groove.

Figure 11:
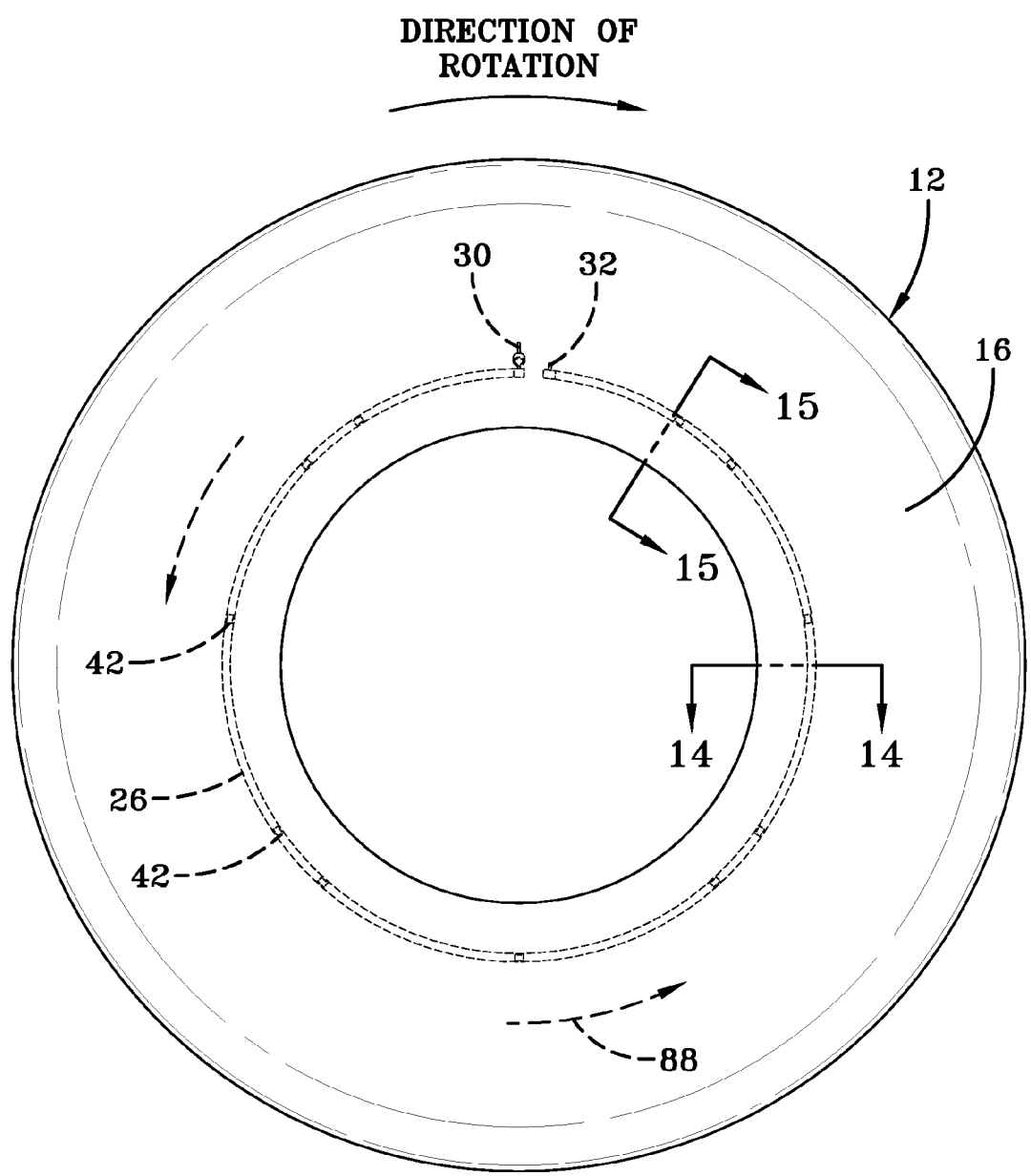
FIG. 11 is a plan view of tire with extruded tubing and check valves in a 360° embodiment.
Figure 14:
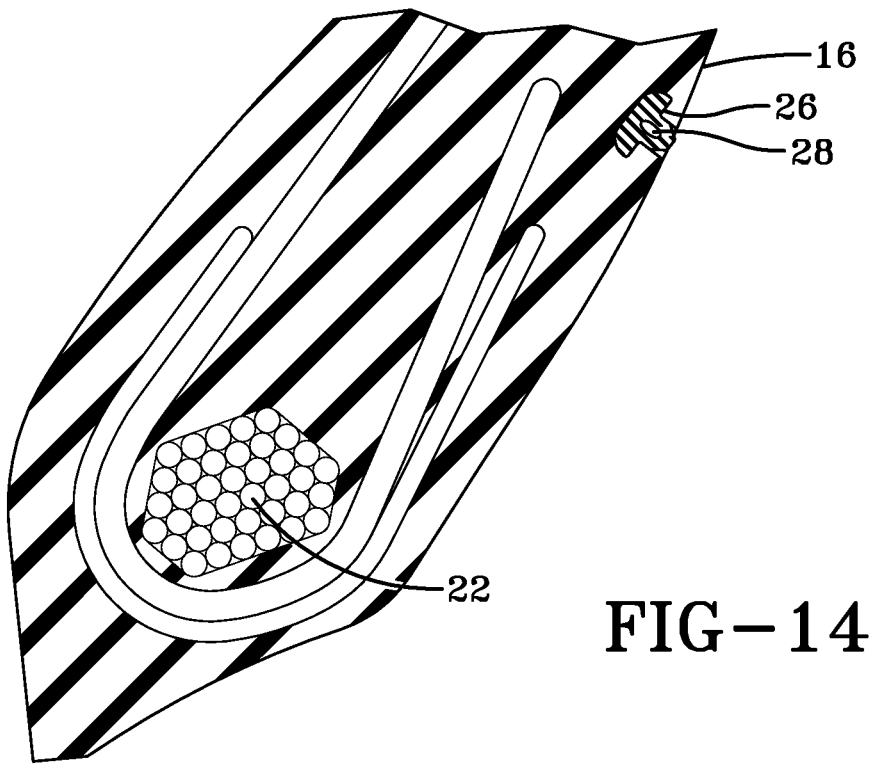
FIG. 14 is an enlarged section view from FIG. 11, taken through the extruded tubing.
Figure 15:
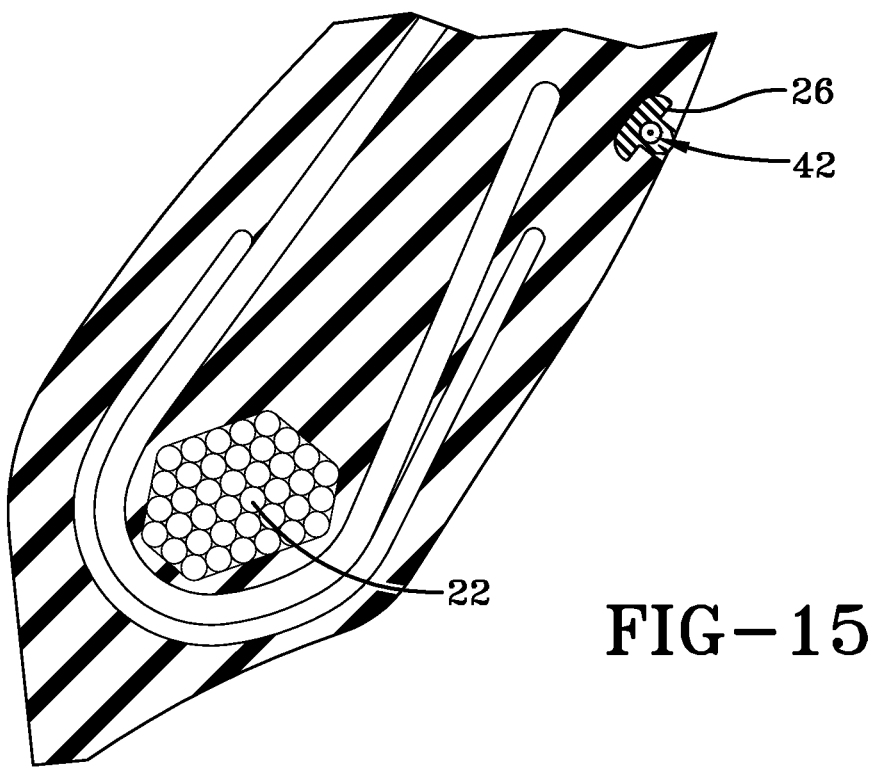
FIG. 15 is an enlarged section view from FIG. 11, taken at the face of a check valve.

The location of the completed air tube assembly into the lower region of tire sidewall 16 relative to the tire bead 22 is seen in section in FIG. 14, and FIG. 15 shows the same sectional view at a check valve location of the air tube assembly 26. Operationally, as the tire rotates in direction 36, seen in FIG. 9, the air tube 26 sequentially flattens for one half of the tire revolution and pumps air between the inlet 30 and outlet 32 and thereby into the tire cavity. The check valves within bodies 42 are spaced along the air tube 26 and oriented to allow air to flow in direction 36 but preclude back air flow in an opposite direction. Alternately, as seen in FIG. 10, a bidirectional pumping configuration for the air tube 26 may be deployed. In the alternative configuration, the air tube 26 constitutes a 360° loop with the inlet device 30 and outlet device 32 180° opposite to each other. Check valve bodies 42 are spaced apart at preferred intervals along the 360° air tube 26. As the tire rotates along a road surface in either a forward direction 82 or a reverse direction 84, the air tube 26 sequentially flattens and unflattens segment by segment. Air is thus pumped bi-directionally along the air tube between the inlet and outlet devices 30, 32 and into the tire cavity. FIG. 11 shows yet a third alternative air tube configuration that allows for a uni-directional pumping of air along the air tube during a complete tire revolution. The inlet and outlet devices 30, 32 are locate proximally to each other at terminal ends of a 360° air tube loop. The check valve bodies 42 are spaced apart along the air tube extent. As the tire rotates in the rotation shown, the air tube 26 sequentially flattens and unflattens. Air is thereby pumped along the air tube 26 in direction 88 between inlet 30 and outlet 32 and then into the tire cavity.

From the foregoing, it will be appreciated that the subject invention provides an air pumping tube and tire system and method of assembling that is efficient and effective. The tire groove 34 is formed to extend into a flexing region of the tire sidewall 16 and the tire 12 is cured. The complementary air pumping tube 26, configured to insert into the tire groove, is adapted to accept check valves while in the green or uncured state. While in the green, uncured condition, one or more access shaft(s) 74 are formed in the air pumping tube 26 to provide admittance of one or more check valve device(s) (42, 50) to a check valve seating depth, wherein in the check valve device(s) align with the air passageway 28. Plug components 78 of the system substantially fill each access shaft 74 after insertion of the check valve devices. Each access shaft 74 is formed by the removal of a slug component 68 from the air maintenance tube and filled subsequently by the insertion of a plug component 78.

Check valve devices are thereby positioned along the air passageway and directionally allow air to flow in a specified direction but prevent the air from back flowing in an opposite direction.

It will further be noted that the check valves are inserted, and the plug component(s) placed in the air pumping tube in an uncured, green state. Subsequent to the placement and enclosure of the check valves within the air pumping tube by system plug components 78, the air pumping tube having the enclosed check valves is cured. The plug components 78, the outer body 42 of each check valve device, and the air pumping tube 26 are composed of compatible materials that bond together as result of the curing procedure. Post cure, the air pumping tube 26 containing the check valves are inserted into the sidewall groove 34 of the cured tire 12.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire system comprising:
   a tire having an elongate tire groove formed to extend into a flexing region of a tire sidewall, the groove having a profiled internal geometry;
   an elongate air pumping tube having an internal elongate air passageway and an external geometric shape substantially complementing the tire groove internal geometry for operably enabling a receipt of the air pumping tube into the tire groove;
   the air pumping tube having at least one access shaft formed therein extending from an outward surface to a check valve seat positioned at a depth within the air pumping tube substantially in line with the air passageway;
   a check valve device configured to insert into the access shaft and seat within the check valve seat in alignment with the air passageway;
   a plug component substantially filling the access shaft to a depth of the check valve device whereby occupying the access shaft.

2. The air maintenance tire system of claim 1, wherein the access shaft is formed and the check valve device seated within the air pumping tube while the air pumping tube is in a green, uncured condition.

3. The air maintenance tire system of claim 2, wherein the access shaft is operably formed by a removal of a slug component from the air maintenance tube with the air pumping tube in the green, uncured condition.

4. The air maintenance tire system of claim 3, wherein the plug component replaces the removed slug component within the access shaft.

5. The air maintenance tire system of claim 4, wherein the air pumping tube operably seats a plurality of the check valve devices through a like plurality of access shafts spaced at preselected intervals along the air pumping tube.

6. The air maintenance tire system of claim 4, wherein the access shaft is operably dimensioned to receive and pass the check valve device to a check valve seat depth, and the plug component to a residency location therein.

7. The air maintenance tire system of claim 4, wherein the air pumping tube is configured having a mushroom sectional configuration comprising a larger diameter tube cap and an adjoining smaller diameter tube base, the air passageway residing substantially at a mid-region of the air pumping tube at the intersection of the cap and base of the air pumping tube.

8. The air maintenance tire system of claim 7, wherein air passageway is substantially elliptical in sectional configuration having a longitudinal axis oriented to extend between the tube cap and the tube base.

9. The air maintenance tire system of claim 8, wherein the access shaft is operably formed by a removal of a slug component from the air maintenance tube with the air pumping tube in the green, uncured condition.

10. The air maintenance tire system of claim 4, wherein the check valve device comprises an outer device body formed of a material composition compatible for bonding with an air tube material composition during a curing operation.

11. The air maintenance tire system of claim 10, wherein the outer device body housing a membrane device operably enables a flow of air through the outer device body in a first direction and operably disables a flow of air through the outer device body in second direction opposite the first direction.

12. A method of assembling an air maintenance tire system comprising:
    forming an elongate tire groove into a flexing region of a tire sidewall, the groove having a profiled internal geometry;
    forming an elongate air pumping tube, the air pumping tube having an internal elongate air passageway and an external geometric shape substantially complementing the tire groove internal geometry for operably enabling a receipt of the air pumping tube into the tire groove;
    forming at least one access shaft within the air pumping tube extending from an outward tube surface to a check valve seat positioned at a depth within the air pumping tube substantially in line with the air passageway;
    seating a check valve device through the access shaft to engage the check valve seat in an alignment with the air passageway;
    filling the access shaft by a plug component to a depth of the check valve device whereby the plug component occupies the access shaft.

13. The method of assembling an air maintenance tire system of claim 12 wherein the access shaft is formed and the check valve device seated within the air pumping tube while the air pumping tube is in a green, uncured condition.

14. The method of assembling air maintenance tire system of claim 13, wherein further comprising removing a slug component from the air maintenance tube to form the access shaft while the pumping tube is in an uncured condition.

15. The method of assembling air maintenance tire system of claim 14, wherein the plug component is configured and dimensioned to replace the removed slug component within the access shaft.

16. The method of assembling air maintenance tire system of claim 15, wherein further comprising seating a plurality of the check valve devices through a like plurality of access shafts spaced at preselected intervals along the air pumping tube.

17. The method of assembling air maintenance tire system of claim 15, wherein further comprising configuring and dimensioning the access shaft to receive and pass the check valve device to a check valve seat depth, and the plug component to a residency location therein.

18. The method of assembling air maintenance tire system of claim 15, wherein further comprising configuring the air pumping tube in a mushroom sectional configuration comprising a larger diameter tube cap and an adjoining smaller diameter tube base, the air passageway residing substantially at a mid-region of the air pumping tube at the intersection of the cap and base of the air pumping tube.

19. The method of assembling air maintenance tire system of claim 18, wherein further comprising configuring the air passageway in a substantially elliptical sectional configuration having a longitudinal axis oriented to extend between the tube cap and the tube base.

20. The method of assembling air maintenance tire system of claim 15, further comprising:
    curing the air pumping tube containing the check valve device; and
    inserting the cured air pumping tube into the tire groove.

* * * * *